(12) United States Patent
Anderson et al.

(10) Patent No.: US 6,608,966 B1
(45) Date of Patent: *Aug. 19, 2003

(54) VCR-TYPE CONTROLS FOR VIDEO SERVER SYSTEM

(75) Inventors: Michael H. Anderson, Westlake Village, CA (US); David B. Aune, Santa Monica, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,743

(22) Filed: Nov. 21, 1996

Related U.S. Application Data

(63) Continuation of application No. 08/319,740, filed on Oct. 7, 1994, now abandoned.

(51) Int. Cl.[7] .......................... H04N 5/92; H04N 5/783
(52) U.S. Cl. ...................... 386/68; 386/82; 386/111; 386/125; 725/115
(58) Field of Search ................ 386/6–8, 33, 68, 386/81, 82, 125–126, 111–112; 348/7, 13; 725/114–117, 138, 144, 82, 92–97; H04N 5/76, 5/781, 5/782, 5/78, 5/92, 7/10, 5/783

(56) References Cited

U.S. PATENT DOCUMENTS

| | | | | |
|---|---|---|---|---|
| 5,140,437 A | * | 8/1992 | Yonemitsu et al. | 358/342 |
| 5,357,276 A | * | 10/1994 | Banker et al. | 348/7 |
| 5,455,684 A | * | 10/1995 | Fujinami et al. | 386/111 |
| 5,461,415 A | * | 10/1995 | Wolf et al. | 348/7 |
| 5,477,263 A | * | 12/1995 | O'Callaghan et al. | 348/13 |
| 5,521,630 A | * | 5/1996 | Chen et al. | 348/7 |
| 5,692,093 A | * | 11/1997 | Iggulden et al. | 386/126 |
| 5,696,869 A | * | 12/1997 | Abecassis | 386/69 |

FOREIGN PATENT DOCUMENTS

| WO | WO 93/16557 | * | 8/1993 | H04N/7/173 |
|---|---|---|---|---|

* cited by examiner

*Primary Examiner*—Thai Tran
(74) *Attorney, Agent, or Firm*—Oppenheimer Wolff & Donnelly LLP; Marc Bobys, Esq.

(57) ABSTRACT

A video server system having the ability to playback movies at a higher than recorded speed. A storage device stores one or more of the movies to be played back. The storage device has the ability to playback the movies in selected segments. A controller is connected to the storage device for causing the storage device to playback a sequential set of movie segments with an alternating series of intervening movie segments missing therefrom. In addition to Fast Forward and Fast Reverse commands, Pause, Slow, Play and Stop commands are also implemented.

31 Claims, 2 Drawing Sheets

VCR-TYPE CONTROLS FOR VIDEO SERVER SYSTEM

This application is a continuation of application Ser. No. 08/319,740, filed Oct. 7, 1994, now abandoned.

FIELD OF THE INVENTION

This inventions relates to devices which store movies for playback viewing and, more specifically, to video server systems which supply movies on demand.

BACKGROUND OF THE INVENTION

VCRs are widely used to see movies at the very moment their viewing is desired. This requires each user to possess a relatively expensive piece of hardware, namely the VCR. Each user must also possess a video cassette of the movie which he wishes to see. This is an additional expense and inconvenience. This expense and inconvenience grows as each user attempts to keep up with the new movies which are released. It also grows when each user wishes to stock a large number of movies for possible viewing.

One technology which has been developed to help solve these problems is to supply electronic signals containing each requested movie from a centralized location. These "video-on-demand" systems are becoming quite popular in hotels. They are also beginning to appear in larger scale systems, such as Community Cable Television ("CATV").

One technique for supplying video-on-demand from a central location is to house and operate a large number of video recorders at the central location. When a particular movie is desired to be viewed, the user communicates with the central location and requests that the movie be played. The video cassette containing the movie is inserted into a video player to which the user is connected.

Such a system still has a substantial cost per user. The equipment needed to accommodate a large number of simultaneous users also requires a large area. Reliability problems also exist because of the numerous mechanical components which must move during operation.

One developing technology for reducing these problems is to utilize what is known as a "video server." The video and audio portions of the movie are digitized and stored as a stream of digital data in a mass storage system. When playback of the movie is desired, the digital data is accessed, converted back into an analog signal, and delivered to the user for viewing. Such a system is advantageous because one mass storage system can supply digital data representative of several movies to several users simultaneously. This can result in a lower overall cost per user. It can also result in enhanced reliability, due to the reduction in the amount of moving mechanical components.

VCRs, on the other hand, usually provided additional functions. VCRs typically can play the desired movie back at high speed, either in the forward direction (i.e., "Fast Forward") or the reverse direction (i.e., "Fast Reverse"). They also can stop the playback of the movie before it has ended (i.e., "Stop"). Many can also play the movie back at a slow speed (i.e., Slow) or freeze the movie on a particular frame (i.e., "Pause").

These VCR-type controls are useful and have come to be expected by users. Accordingly, it would be desirable to incorporate these VCR-type controls in a centralized video server system.

Playing back a movie at high speed, however, typically requires a much higher bandwidth in many of the components in the video server system, such as the mass storage system, the communication network, and the reception equipment. In many systems, this increased bandwidth is simply not available. In other systems, the cost of the increased bandwidth may be too great.

Another typical problem with playing back a movie at high speed is a marked reduction in the information which is communicated to the user. Typically, the audio is either completely eliminated or played back at a high-pitched and difficult-to-understand rate. The fast-moving video is also often confusing and unenjoyable. This problem, of course, exists even in connection with the traditional VCR machine.

SUMMARY OF THE INVENTION

One object of the present invention is to obviate these as well as other problems in the prior art.

A further object of the present invention is to provide VCR-type controls for a video server system.

A still further object of the present invention is to provide a video server system which can playback a desired movie at high speed, either in the forward or reverse direction.

A still further object of the present invention is to provide a video server system which can playback a desired movie at a high speed, without increasing the bandwidth requirements of the video server system.

A still further object of the present invention is to provide a video server system which can playback a movie at a high speed, but in a fashion that conveys a high degree of information and in a comfortable format to the viewer.

A still further object of the present invention is to provide a video server system which can deliver a movie at a high rate of speed which is stored in a compressed digital format, such as MPEG ("Motion Picture Experts Group").

A still further object of the present invention is to provide a video server system which can playback a movie at a high speed without significant additional cost.

These and still further objects, features and benefits of the present invention are achieved by playing back a sequential set of movie segments with an alternating series of intervening movie segments missing therefrom. Using this technique, the movie is effectively played back at a faster speed. But the speed at which any segment of the movie is played back is not increased. Such a system effectively plays back a movie at a high rate of speed, without increasing the required bandwidth of the system.

Such an approach is also believed to provide a high speed presentation which is more intelligible to the viewer and more comfortable for him to view.

Instead of no audio or high-pitched audio at a fast rate which is difficult-to-understand, the viewer hears audio at a normal pitch and rate. Although alternating segments of the audio are deleted, a series of chopped audio segments played back at normal pitch and speed are believed to be more intelligible and more comfortable to hear than a continuous audio segment played back at a high pitch and speed.

A similar advantage is believed to result in the video portion of the movie. The video which the user sees proceeds at its normal speed. Although alternating segments have again been omitted, segmented video at normal speed is again believed to be more intelligible and comfortable to view than continuous video at an accelerated speed.

In one preferred embodiment, each continuous segment which is played back is approximately two seconds in length. The alternating segments which are omitted are approximately equal in length to the alternating segments which are played back. This timing scheme is believed to be the most comfortable and comprehensible. It also results in a demand for data from the video server system which is most efficient using the video server system selected by Applicants.

Another feature of the present invention is directed to eliminating distortions which can occur in the beginning of each played back segment when playing back data stored in MPEG compressed format. The beginning of a played-back segment often may not coincide with the "I-Frame" of a recorded MPEG stream, but rather with a "B-Frame" or "P-Frame" of that stream. As is well known in the art, I-Frames contain data representative of an entire movie frame, while B-Frames and P-Frames contain data representative of only changes that have occurred in a movie frame with respect to another movie frame. In one embodiment of the invention, the system ignores (i.e., drops), all initial B-Frames or P-Frames which are not preceded by an I-Frame. In an alternate embodiment, the system ensures that the reading of each played-back segment from storage begins with an I-frame.

These and still further objects, features and benefits of the present invention will now become clear from an examination of the drawings, taken in conjunction with the following detail description of the preferred embodiments.

DETAILED DESCRIPTION OF THE PREFERRED EMBODIMENTS

FIG. 1(a) is an illustration of a sequential series of movie frames being presented in a forward direction. As can be seen in FIG. 1(a), the illustrated series begins with frame number 10 and ends with frame number 31. It should, of course, be understood that this is merely a portion of the total set of frames which comprise a particular movie.

FIG. 1(b) is an illustration of the sequential series of movie frames shown in FIG. 1(a) being played back at a high rate of speed in the forward direction (i.e., "Fast Forward"), beginning with frame number 11, in accordance with one embodiment of the present invention. As can be seen in FIG. 1(b), alternating intervening segments of the movie, i.e., frames 15–18 and 23–26, have been deleted from the stream of frames in FIG. 1(b) which is being played back. Using this technique, the viewer still hears the audio and still sees the video in each segment in its normal manner. Yet, the movie is effectively being played back at twice its normal rate. Of course, alternating segments of the movie have been removed from the playback stream.

Applicants have found this to be a more comfortable and comprehensible presentation than what a viewer would otherwise see and hear from an ordinary VCR being played back on Fast Forward. Equally significant is the fact that the Fast Forward stream of frames shown in FIG. 1(b) does not require data to be transmitted at any higher rate. Thus, it does not require an increase in the required bandwidth of any component in the delivery system.

This same technique can similarly be applied to view a movie at a high rate of speed in the reversed direction (i.e., Fast Reverse), obtaining the same benefits. Of course, in the reverse direction, the audio would not be played back.

FIG. 2(a) illustrates a sequential series of movie frames being presented in reverse order. FIG. 2(b) illustrates the sequential series of movie frames shown in FIG. 2(a) being played back on Fast Reverse, beginning with frame number 30, in accordance with another embodiment of the present invention.

As can be seen by the numbered sequence of frames in FIG. 2(b), each segment of frames which is played back on Fast Reverse is actually played back in the forward direction. Only the order of segments is reversed. In this way, a movie can be viewed in the reverse direction, while the actual segments which are being viewed and heard run in the forward direction. Although this approach is preferred, presenting each and every frame in the playback stream in a reverse order is also considered to be within the scope of the present invention. When using this later technique, however, the audio portion would probably be muted.

Figure 1:
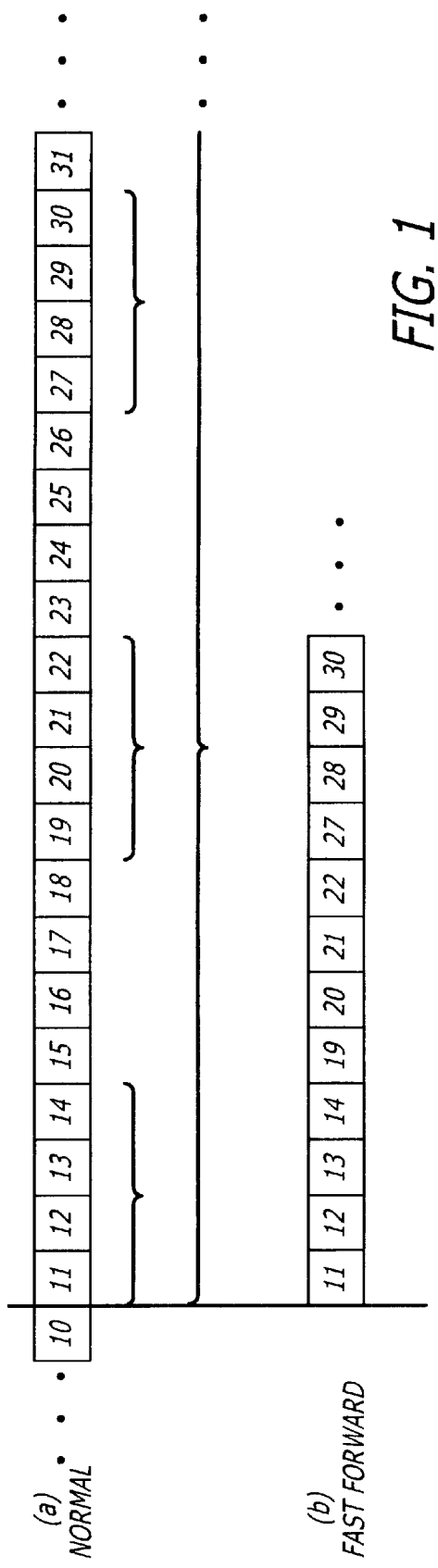
FIG. 1(a) is an illustration of a sequential series of movie frames being presented in a forward direction.
FIG. 1(b) is an illustration of the sequential series of movie frames shown in FIG. 1(a) being played back on Fast Forward, beginning with frame number 11, in accordance with one embodiment of the present invention.
Figure 2:
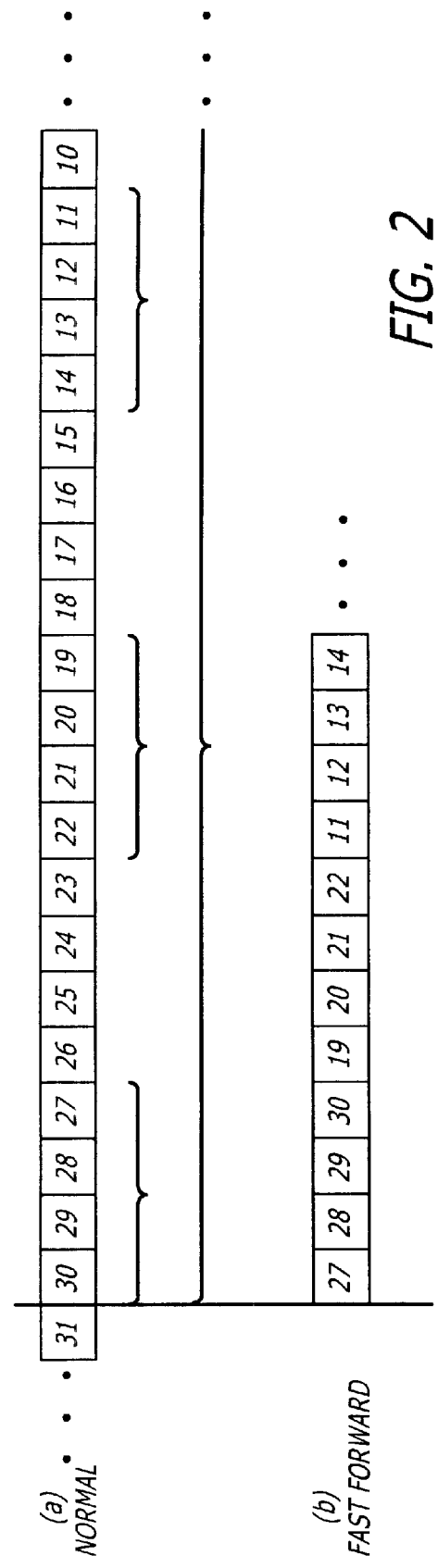
FIG. 2(a) is an illustration of a sequential series of movie frames being presented in a reverse direction.
FIG. 2(b) is an illustration of the sequential series of movie frames shown in FIG. 2(a) being played back on Fast Reverse, beginning with frame number 30, in accordance with another embodiment of the present invention.

Although FIG. 1 and FIG. 2 show each segment which is played back and which is omitted to be of 4 frames in length, this length is by no means required. The present invention encompasses all lengths of segments which are played back and which are omitted.

Nevertheless, applicants have found that a playback segment of approximately two seconds in length appears to be optimum. This is long enough so that the played back audio and video can convey substantial information to the viewer and will be comfortable for him to view. It is short enough to allow a substantial increase in the effective viewing speed of the movie, without requiring the excised segments to be of a prolonged length.

The two second length for a played-back segment also enhances the efficiency of the particular mass storage system with which applicants are currently working. Specifically, applicants are currently storing the movies to be viewed using MPEG compression on a hard disk drive array and recording that data using striping techniques. This technology is discussed in more detail in U.S. Pat. No. 4,870,643, entitled "Parallel Disk Array Storage System," U.S. Pat. No. 5,191,584, entitled "Mass Storage Array With Efficient Parity Calculation," and U.S. patent application Ser. No. 08/210,899, entitled "Disk Drive Array For Multi-User Audio/Video Data Server Using Pipelined, Fault Tolerant Data Retrieval Method." Both of these patents and the application are assigned to the Micropolis Corporation of Chatsworth, Calif., also the assignee of the present invention. The two second interval for the played-back segment matches the length of a single stripe, plus the time necessary for reconstructing that stripe in the event of a playback error.

Applicants also prefer to have the length of the alternating segments which are not played back to be approximately equal to the length of the alternating segments which are played back as shown in FIG. 1(b) and FIG. 2(b). A shorter omitted segment would reduce the playback speed. A longer omitted segment would cause a greater deterioration in the intelligibility of the information which is played back, as well as the comfort in viewing and hearing it.

To enhance the speed, the omitted segments might also be much greater in duration than the played back segments. Conversely, the omitted segments might be shorter in duration then the played back segments if only a small increase in speed was desired. Control means might advantageously be added to vary the degree to which the speed is enhanced (or reduced). As should be apparent, adjustment of the control would, in turn, adjust the relative duration of each played back segment with respect to each omitted segment to obtain the requested speed.

Figure 3:
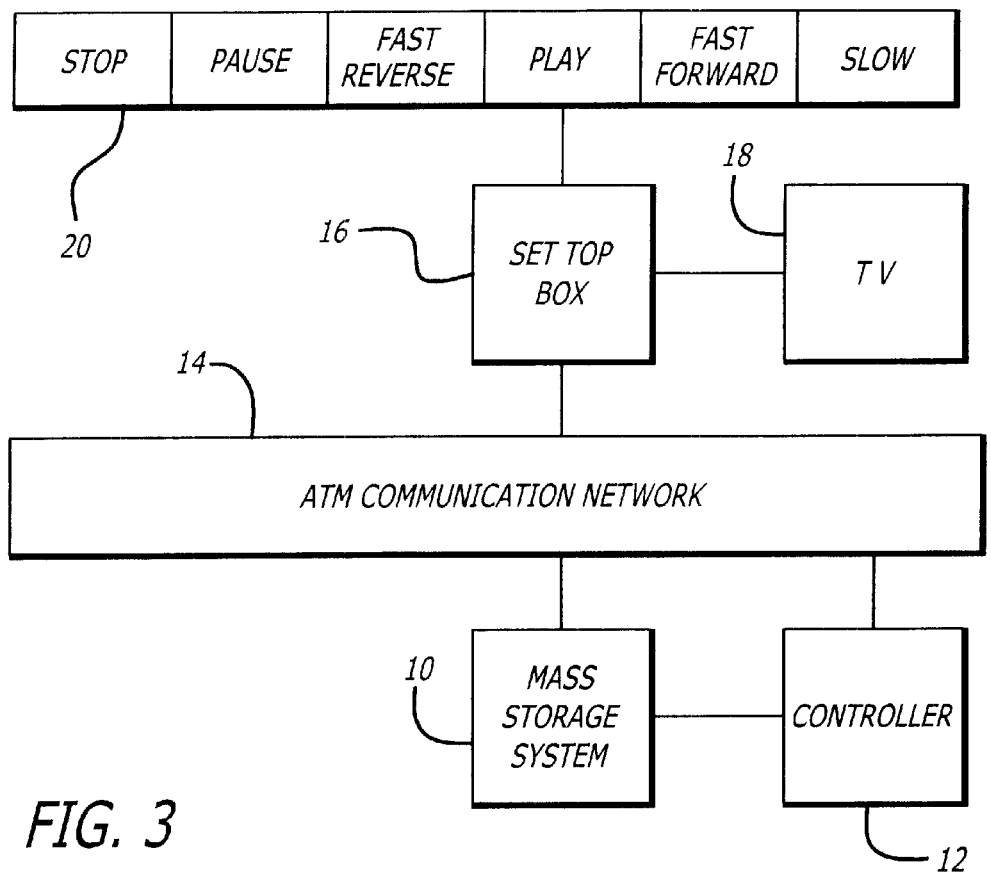
FIG. 3 is a block diagram of some of the principle components of a typical video server system adopted to incorporate one embodiment of the present invention.

FIG. 3 is a block diagram of some of the principal components of a typical video server system adopted to incorporate one embodiment of the present invention. Such a system usually includes a mass storage system 10 and a controller 12 connected to the mass storage system 10. It also includes an ATM ("Asynchronous Transfer Mode") communication network 14 connected to the mass storage system 10 and the controller 12, a set top box 16 connected to the ATM communication network 14, and a TV 18 connected to the set top box 16.

Typically, a viewer of the TV 18 desiring to see a video on demand will communicate this desire, such that it is received by the controller 12. The communication may take the form of operating the set top box 16 to generate a request signal which is delivered over the ATM communication network 14 to the controller 12. It may also take a more pedestrian form, such as the user of the TV 18 telephoning the operators of the system to program the controller 12 to playback the desired movie. Numerous other forms are also possible.

The mass storage system 10 stores the movies to be played back. Upon receipt of a request for a particular movie, the controller 12 signals the mass storage system 10 to play the movie back. The played back signal is delivered from the mass storage system 10 over the ATM communication network 14 into the set top box 16. The set top box 16 transforms the received digital information into a type of signal which the TV 18 can receive and playback.

The mass storage system 10 should have the ability to rapidly playback segments of the movie to be viewed in a non-sequential order. Storing the movie as digital data on disk drives is well-suited to this purpose. Preferably, the mass storage system 10 is a Redundant Array of Inexpensive Disk Drives, often referred to as a RAID system, such as described in the patents and patent application cited before. Laser disks might also be used.

The VCR-type controls to be implemented, such as Fast Forward, Fast Reverse, Play, Pause, Slow and Stop, may be mounted on or otherwise associated with the set top box 16. They may also be activated by a standard remote control device. Just as well, they could be included in other devices which are connected to the ATM communication network 14. One typical arrangement is illustrated in FIG. 3 as VCR control bank 20.

Typically, the controller 12 would receive the signal from one of the VCR-type controls that were depressed (or otherwise activated) on the control bank 20. The controller 12, in turn, would direct the mass storage system 10 to respond to the VCR command. A Play command would cause each movie frame to be played back sequentially at normal speed. A Fast Forward command would cause appropriate instructions to be issued to the mass storage system 10 to produce a sequential set of movie segments with an alternating series of intervening movie segments missing therefrom, such as is shown in FIG. 1(b). A Fast Reverse command would have the same effect, except that the movie segments would be played back in the reverse order, such as is shown in FIG. 2(b). A Pause command would cause the same movie frame to be repeatedly played back. A Slow command would cause each movie frame to be played back sequentially, except at a slower speed. A Stop command would cause delivery of movie frame data to cease.

Although a Pause command could be implemented by the controller 12 repeatedly sending instruction to the mass storage system 10 to playback the same movie frame, a broad variety of other techniques could be used as well. For example, the set top box 16 could contain a buffer and this buffer could be used to hold the last movie frame. Using this implementation, there would be no need for any further movie data to be delivered over the ATM communication network 14 when the Pause command is issued. The pressing of the Pause button would cause the controller 12 to direct the mass storage system 10 to stop retrieving and sending any movie data, while it would cause the set top box 16 to repeatedly deliver the last stored movie frame. Of course, the audio would be deleted.

Although the invention has now been described in terms of the configuration shown in FIG. 3, it should be understood that the invention is usable in a broad variety of other configurations. For example, the invention could well be used in a system having no communication network or a network other than of the ATM type. Although a single mass storage system is illustrated in FIG. 3 as being controlled by a single controller, there could be many mass storage systems and many controllers, as well as a physical merging of the components which comprise each.

Many techniques for sending control information and receiving movie information could also be used, other than the set top box 16 shown in FIG. 3. For example, the set top box 16 could, instead, be a distribution node in a small community which would receive movie data for several viewers, translate that data into the required audio and video or TV signals, and deliver each to a television set. In such a system, of course, other means would need to be included to receive the VCR-type commands from the TV viewer and to process them.

Systems which store the desired movies in a digital format typically compress the movie data prior to storage. This reduces the amount of storage space which is needed, as well as the bandwidth requirements for the mass storage system and communication network.

Some compression techniques achieve compression, in part, by only storing changes which occur from movie frame to movie frame, rather than all of the information in each movie frame itself.

Figure 4:
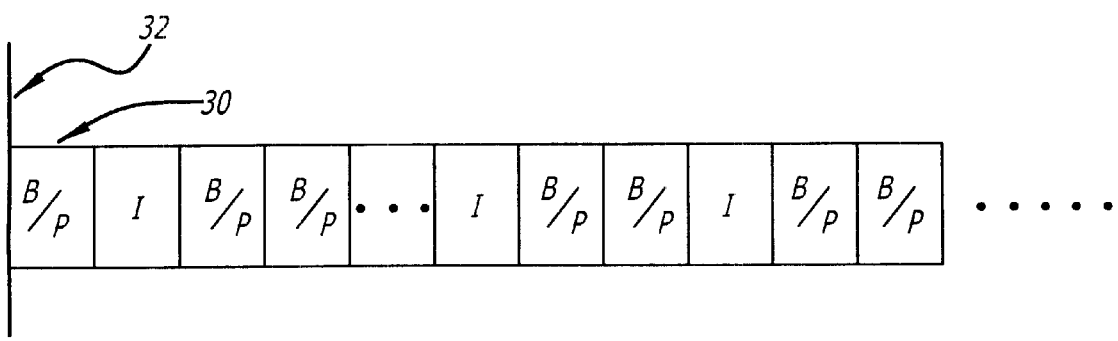
FIG. 4 illustrates a typical stream of data blocks being read from a video server that has stored a movie in MPEG compressed format.

FIG. 4 illustrates a typical stream of data blocks being read from a video server that has stored a movie using one such compression technique, MPEG. As is well known in the art, the blocks in FIG. 4 marked with an "I" are "I-Frames," each one of which contain data representative of an entire single movie frame. Following each I-Frame is a series of "B-Frames" or "P-Frames," designated in FIG. 4 as "B/P" frames. The B/P designation in FIG. 4 is meant to indicate that the designated frame is either a B-Frame or a P-Frame. P-Frames contain data representative of a change from a frame prior in time. B-Frames contain data representative of a change from either a prior or subsequent frame. A B-Frame or P-Frame is chosen during compression depending upon which achieves the maximum compression.

Many types of mass storage systems contain no means for insuring that the beginning of each played back movie segment begins with an I-Frame. In such systems, the very first frame of a new movie segment might be a B-Frame or a P-Frame. This is illustrated in FIG. 4 by the orphaned B/P Frame 30, which is the first frame of a requested movie segment that is being read back, beginning from the point in time marked as 32 in FIG. 4. Without the antecedent I-Frame, however, the beginning of the movie segment may be distorted. These distortions are particularly problematic in conjunction with the present invention because they may occur at frequent periodic intervals.

Applicants have conceived of several techniques to eliminate this distortion.

One technique is simply to drop all leading B-Frames or P-Frames which are not proceeded by anantecedent I-Frame from the data stream which is read before it is converted into the television signal. This could be done, for example, by the set top box 16 shown in FIG. 3 or, to reduce network traffic, on the data-storage side of the ATM communication network 14.

In systems where economy is paramount, the dropping of orphaned B-Frames or P-Frames by the set top box 16 shown in FIG. 1 is often particularly advantageous. Set top boxes which are designed to receive and decode MPEG movie data usually include a chip which is already designed to perform this dropping function to avoid initial distortions when channels are changed.

Other techniques could alternatively be implemented to avoid these types of distortions. For example, techniques could be employed to synchronize the reading of frames from the mass storage system so that orphan B-Frames or P-Frames are never read in the first instance. Such techniques, for example, could include recording a special header to mark the beginning location of each I-Frame.

Although the present invention has thus-far been described as useful in the delivery of movies in a video server system, the present invention not means limited to this application. The present invention is also applicable to systems which provide only video information or only audio information. The present invention is also useful in any application in which sequential information needs to be reviewed at a faster than normal rate and in which a spotted fast-pace review of that information is acceptable. In short, the present invention is of far broader scope than what has thus-far been described and is limited only by the following claims.

We claim:

1. A video server system which plays back a movie regardless of its content at a higher than recorded speed upon receipt of and in response to a single request to play back the movie at a higher than recorded speed comprising:
   a storage device for storing the movie to be played back and for playing back the movie in selected segments; and
   a controller connected to said storage device for causing said storage device to play back a sequential set of substantially adjacent movie segments of substantially the same length from the movie with an alternating series of intervening movie segments of substantially the same length omitted therefrom upon receipt of and in response to the single request to play back the movie at a higher than recorded speed, wherein the length of the play back matches the length of a single stripe in the storage device, wherein said adjacent movie segments comprise a plurality of consecutive frames of said movie, and wherein said alternating series of intervening movie segments is omitted from said sequential set of adjacent movie segments during the playback, regardless of the content of said alternating series of intervening movie segments, and further wherein said plurality of consecutive frames without a reference frame are eliminated.

2. The video server system of claim 1 wherein said sequential set of movie segments are played back in a forward sequence upon receipt of a request to playback the movie at a higher than recorded speed in the forward direction.

3. The video server system of claim 1 wherein said sequential set of movie segments are played back in a reverse sequence upon receipt of a request to playback the movie at a higher than recorded speed in the reverse direction.

4. The video server of claim 3 wherein the portion of the movie contained in each played back segment is played back in the forward direction.

5. The video server system of claim 1 wherein the time duration of each played back segment is substantially the same as the time duration of each missing segment.

6. The video server system of claim 1 wherein the length of each played back segment is approximately two seconds.

7. The video server system of claim 6 wherein the length of each missing segment is approximately two seconds.

8. The video server system of claim 1 wherein said storage device includes a hard disk drive.

9. The video server system of claim 8 wherein said storage device includes a plurality of hard disk drives in a RAID configuration and wherein the movie to be played back is recorded on said plurality of hard disk drives in stripes.

10. The video server system of claim 1 wherein the movie is stored on said storage device in a digital and compressed format.

11. The video server system of claim 10 wherein the compressed format is MPEG.

12. The video server system of claim 11 wherein orphaned P-Frames and B-Frames at the beginning of each played back movie segment are eliminated.

13. The video server system of claim 12 wherein a set top box is used to decode the movie and wherein the elimination of the orphaned P-Frames and B-Frames occurs in the set top box.

14. The video server system of claim 12 wherein said storage device and/or said controller prevent(s) orphaned P-Frames and B-Frames from being read from said storage device.

15. The video server system of claim 14 wherein I-Frames are recorded on said storage device and wherein a header is recorder on said storage device to delineate the location of each I-Frame.

16. The video server system of claim 1, wherein said plurality of consecutive frames without a reference frame are eliminated.

17. A method of playing back a movie regardless of its content from a video server at a higher than recorded speed upon receipt of and in response to a single request to play back the movie at a higher than recorded speed comprising the steps of:
   receiving a single request to playback the movie at a higher than recorded speed; and
   playing back a sequential set of substantially adjacent segments of substantially the same length of the movie with an alternating series of intervening movie segments of substantially the same length omitted therefrom upon receipt of and in response to the single request to play back the movie at a higher than recorded speed, wherein said adjacent movie segments comprise a plurality of consecutive frames of said movie including at least one I-frame, B-frame and P-frame such that a first frame of said plurality of consecutive frames of said adjacent movie segments comprises an I-frame, and wherein said alternating series of intervening movie segments is omitted from said sequential set of adjacent movie segments during the playback, regardless of the content of said alternating series of intervening movie segments, and further wherein B-frames and P-frames without a reference frame are omitted from said sequential set of adjacent movie segments.

18. The movie playback method of claim 17 wherein the time duration of each played back segment is substantially the same as each missing segment.

19. The movie playback method of claim 17 wherein the length of each played back segment is approximately two seconds.

20. The movie playback method of claim 19 wherein the length of each missing segment is approximately two seconds.

21. The video server system of claim 17 wherein said sequential set of movie segments are played backed beginning with an I-frame by dropping all leading B-frames and P-frames not preceded by an antecedent I-frame.

22. A network system for playing back a movie regardless of its content at a higher than recorded speed upon receipt of and in response to a single request to play back the movie at a higher than recorded speed comprising:
a storage device for storing the movie to be played back and for playing back the movie in selected segments;
a controller connected to said storage device for causing said storage device to play back a sequential set of substantially adjacent movie segments lasting two seconds in length from the movie with an alternating series of intervening movie segments lasting two seconds in length missing therefrom upon receipt of and in response to the single request to play back the movie at a higher than recorded speed, wherein said adjacent movie segments comprise a plurality of consecutive frames of said movie including at least one I-frame, B-frame and P-frame such that a first frame of said plurality of consecutive frames of said adjacent movie segments comprises an I-frame, and wherein said alternating series of intervening movie segments is omitted from said sequential set of adjacent movie segments during the playback, regardless of the content of said alternating series of intervening movie segments and further wherein B-frames and P-frames without a reference frame are omitted from said sequential set of adjacent movie segments; and
a communication network connected to said controller and to said storage device for receiving a request for the playback of a movie at a higher than recorded speed, for delivering that request to said controller, and for delivering data representative of that movie from said storage device to the viewer.

23. The video server system of claim 22 wherein said sequential set of movie segments are played backed beginning with an I-frame by dropping all leading B-frames and P-frames not preceded by an antecedent I-frame.

24. The network system of claim 22, wherein B-frames and P-frames without a reference frame are omitted from said sequential set of adjacent movie segments.

25. An information delivery system having the ability to play back recorded information regardless of its content at a higher than recorded speed upon receipt of and in response to a single request to play back the information at a higher than recorded speed comprising:
a storage device for storing the information to be played back and for playing back the information in selected segments; and
a controller connected to said storage device for causing said storage device to play back a sequential set of information segments of substantially the same length from the information with an alternating series of intervening information segments of substantially the same length omitted therefrom upon receipt of and in response to the single request to play back the information at a higher than recorded speed, wherein said information segments comprise a plurality of consecutive set of data such that said plurality of consecutive set of data comprises at least one segment of intraframe data, at least one segment of interpolated frame data and at least one segment of predictive frame data such that a first said information segment of said plurality of consecutive set of data of said information segments comprises intraframe data, and wherein said alternating series of intervening information segments is omitted from said sequential set of adjacent information segments during the playback, regardless of the content of said alternating series of intervening information segments, and further wherein interpolated frames and predictive frames without a reference frame are omitted from said sequential set of adjacent information segments.

26. The video server system of claim 25 wherein said sequential set of information segments are played backed beginning with intraframe data by dropping all leading interpolated frame data and predictive frame data not preceded by an antecedent intraframe data.

27. An information delivery system having the ability to play back recorded information regardless of its content at a higher than recorded speed upon receipt of and in response to a single request to play back the information at a higher than recorded speed comprising:
a storage device for storing the information to be played back and for playing back the information in selected segments; and
a controller connected to said storage device for causing said storage device to play back a sequential set of information segments lasting two seconds in length from the information with an alternating series of intervening information segments lasting two seconds in length omitted therefrom upon receipt of and in response to the single request to play back the information at a higher than recorded speed, wherein said information segments comprise a plurality of consecutive set of data, and wherein said alternating series of intervening information segments is omitted from said sequential set of adjacent information segments during the playback, regardless of the content of said alternating series of intervening information segments, and further wherein said controller varies the degree to which the speed is altered.

28. A video server system which plays back a movie regardless of its content at a higher than recorded speed upon receipt of and in response to a single request to play back the movie at a higher than recorded speed comprising:
a storage device for storing the movie to be played back and for playing back the movie in selected segments; and
a controller connected to said storage device for causing said storage device to play back a sequential set of substantially adjacent movie segments wherein each of said adjacent movie segments begins with an I frame and contains B frames and P frames which reference I, B and P frames, wherein said controller eliminates orphaned B and P frames when the movie segment no longer contains the reference frame of the orphaned B and P frames.

29. The video server system of claim 28 wherein said controller eliminates the orphaned B and P frames before transmitting the orphaned B and P frames for playback.

30. The video server system of claim 28 wherein said controller eliminates the orphaned B and P frames after receiving the movie segments at the storage device.

31. The video server system of claim 28 wherein said controller records a header to mark the beginning location of each I frame such that the controller eliminates the orphaned B and P frames by not reading the orphaned B and P frames.

* * * * *